Aug. 13, 1968  G. M. BENSON  3,396,806

THERMAL UNDERGROUND PENETRATOR

Filed July 28, 1964  2 Sheets-Sheet 1

INVENTOR
GLENDON M. BENSON
BY Samuel Lindenberg
ATTORNEY

INVENTOR
GLENDON M. BENSON
BY Samuel Lindenberg
ATTORNEY

United States Patent Office 3,396,806
Patented Aug. 13, 1968

3,396,806
THERMAL UNDERGROUND PENETRATOR
Glendon M. Benson, Danville, Calif., assignor to Physics International Company, Berkeley, Calif., a corporation of California
Filed July 28, 1964, Ser. No. 385,584
17 Claims. (Cl. 175—11)

This invention relates to apparatus for enabling underground penetration such as digging, drilling or tunneling and more particularly to improvements therein.

One of the proposals, which has been made for the purpose of drilling below the surface of the earth deeper than can be done economically with conventional drilling techniques, has been to employ a nuclear reactor for the purpose. As exemplified in Patent 3,115,194, the nuclear reactor can develop heat at a sufficient temperature so that the underlying rock is melted and the reactor can sink through the resulting magma, because the average density of the reactor is made greater than the density of the magma. At a predetermined depth, a ballast package at the bottom end is dropped which causes the average density of the reactor to be less than the density of the magma whereby this "needle" reactor would float back to the surface of the earth.

While this concept may be suitable for underground exploratory purposes, it is not satisfactory for digging a permanent hole of the type required for an oil well, for example. No provision is made for removal of the magma after it is created so that effectively when the "needle" floats back to the surface of the earth no hole is left behind it. Furthermore, the requirement for the "needle" that the heat energy of a nuclear reactor occur on both ends does not lend itself to efficient utilization of said energy. Also, since the "needle" depends upon gravity to direct it downwards in a straight line and buoyancy to return it to the earth's surface, the arrangement is not suitable for drilling a permanent hole which is to be straight, but rather can only be used for the purpose of sampling the earth at the indicated depth of penetration.

In addition, the "needle" is limited in the rate that heat energy can be supplied to the rock to be penetrated. This limit is caused by the thermal conductivity of the reactor and supporting structures. The heat flux so conducted axially is sufficiently low so as to cause a negligible melt rate.

Accordingly, an object of this invention is to provide a novel thermally powered underground penetrating system.

Yet another object of the present invention is the provision of a novel construction for a thermally powered underground penetrating system enabling the utilization of different types of thermal power sources such as a nuclear reactor or an electrical thermal power source.

Still another object of the present invention is the provision of a novel and useful thermally powered underground penetrating system wherein the material through which penetration occurs is removed and a casing is provided simultaneously around the remaining hole.

Yet another object of the present invention is the provision of a novel and unique thermally powered underground penetrator having an easily controllable direction of penetration.

These and other objects of the invention may be achieved by using a thermal energy source which can provide a sufficiently high temperature, so, that either by the direct application of the heat, or by the application through a coolant, earth and rock are melted. Such a thermal energy source may be a nuclear reactor, electrical heaters, or some other form. Where a coolant is used, it is circulated through the energy source until brought to a suitable temperature and then it is applied to the rock to be melted. Provision is made for causing this melted rock to flow behind the reactor where it is mixed with a drilling fluid which is pumped from the surface of the earth to be carried thereby back to the earth. Provision is also made for altering the direction of penetration of the thermally powered penetrator, as may be required, for maintaining the direction of the hole in a preferred direction. Provision is also made for smoothing out the bore of the hole as the thermally powered penetrator continues to penetrate into the surface of the earth.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
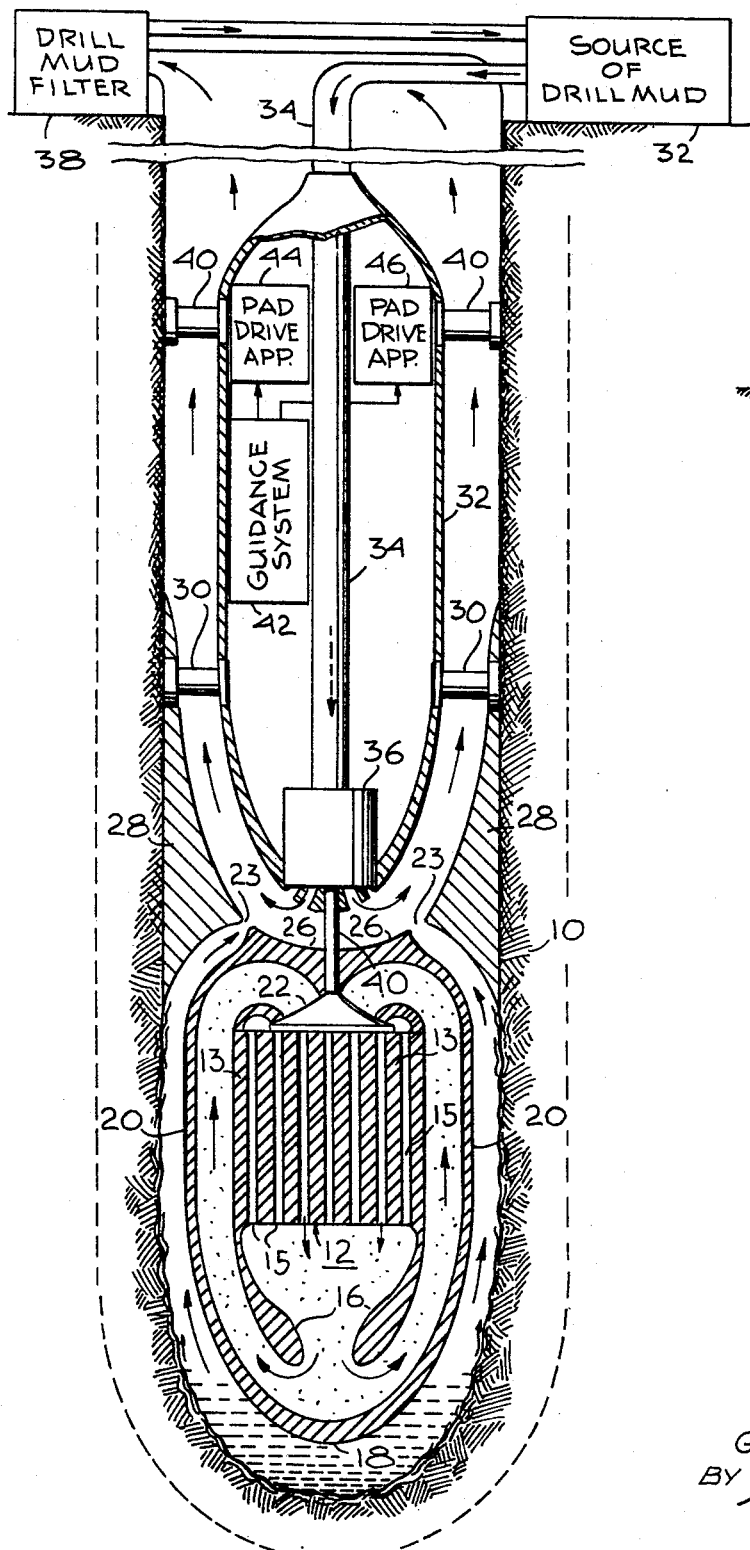
FIGURE 1 is a cross-sectional view of an embodiment of the invention.
Figure 2:
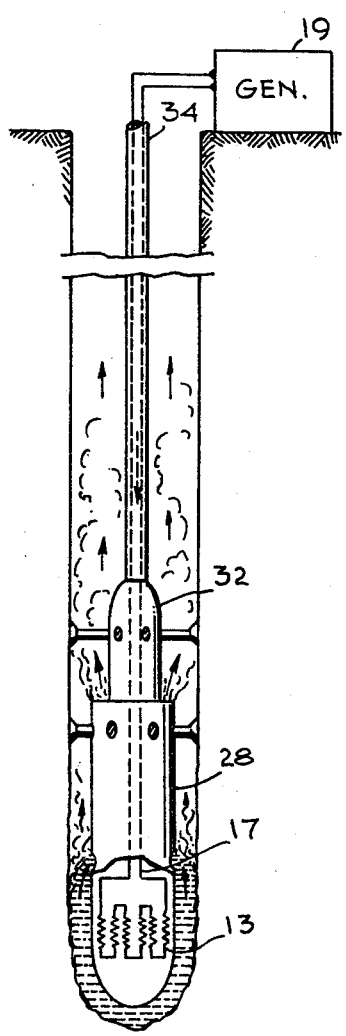
FIGURE 2 is a schematic diagram showing how electrical energy is provided for an electrical thermal generator.

Referring now to FIGURE 1, there may be seen a cross-sectional view of one embodiment of this invention. The embodiment of the invention is shown after it has penetrated into the rock 10 below the surface of the earth. The invention comprises a thermal energy generator 12 with a construction illustrated as a plurality of rods 13, with passageways therethrough for enabling the circulation of a coolant. If the thermal energy generator uses electricity for power, then these rods may be made of a refractory material, such as graphite or hafnium carbide. As shown in the schematic diagram in FIGURE 2, the rods 13 are electrically connected in series and are connected through wires 17 passing through a mud pipe 34 to a source of electrical energy 19 at the surface. By way of example, a suitable coolant may be bismuth. The thermal energy generator may be a reactor which may be of the thermal, epithermal or fast reactor type which is enriched in $U^{233}$, $U^{235}$ or $Pu^{239}$ and which employs a refractory moderator. In this case the rods 13 may be made of the material usually used in reactor cooling device structures, including hafnium carbide or pyrolitic graphite. In flowing through the reactor, the coolant is heated to a temperature on the order of 2000°–2500° K. by the reactor. The coolant flows downward through a refractory deflector 16, 16 to the refractory face plate 18 which may be made of hafnium carbide, and then is directed as shown by the arrows up a flow channel which includes side walls 20, 20 also made of a refractory material, which may be hafnium carbide. The coolant is then directed into a coolant recirculatory pump, such as impeller 22 and thereafter by the pump back through the reactor, thereby completing the fluid cycle. The pump may also be made of a refractory material, such as hafnium carbide.

The combination of high heat flux and high temperature at the face plate 18 insures both a maximum melting rate at the area where it is most required and a minimum of thermal energy loss by diffusion into the surrounding medium. The heated face plate 18 melts the rock which may now be called lava, and the downward force exerted on the lava by the weight of the penetrator, amongst other factors, causes it to flow around the face plate and up the channel formed between the walls 20 of the reactor and the walls of the hole. The heated reactor side walls insure a liquidous lava condition, which is necessary for a proper injection of the lava through lava nozzles 23, 23 into drilling mud. The lava nozzles are defined by the space between insulator walls 26, 26 which form the top portion of the reactor and extend from the refractory walls 20, 20, and other insulating walls 28, 28 which are supported from the pads 30, 30 attached to the shell structure 32.

The drilling mud comes from a source 33 which may be located on the surface. Drilling mud is pumped from the source through a pipe 34 and at the bottom of the pipe it drives the rotor of a turbine 36. The turbine 36 drives the shaft 40 on which the impeller 22 of the pump of the thermal reactor coolant is mounted.

The mud, after passing through the blades of the turbine 36, is directed into contact with the lava coming through the lava nozzles 23, 23. The drilling mud temperature is maintained considerably lower than the melting temperature of the rock by a high mud circulation rate. Accordingly, the rapid contact of the hot lava with the cool drilling mud causes a rapid contraction of the lava, which fractures the lava, by creating high thermal stress concentrations, into a particulate. This particulate is then transported to the surface by the drilling mud in a manner similar to that presently used for rotary drills. The drilling mud is pumped under high pressure at the surface. The mud pump not only causes mud circulation, but also serves as a hydraulic power source at the bottom of the hole. As described, this hydraulic power is converted into shaft power which is utilized to drive the heat transfer fluid pump and can also drive an electrical generator, if required, which serves as a power supply for both the reactor control and penetrator guidance apparatus. The drilling mud returns to the surface through the hole which has been made where it is fed to drill mud filtering apparatus 38 for the removal of the particulate. After the particulate has been removed, the drill mud is fed back into the source of drill mud to be used again.

The casing 32 encloses the bottom portion of the pipe 34, which furnishes the drilling mud, as well as auxiliary equipment. The casing walls, as previously described, serve as a support for the pads 30 which together with the insulation walls 28 perform the function of controllably cooling, smoothing and solidifying the walls of the hole. In addition to the pads 30, there are guidance pads 40 which are supported from the housing 32 and are spaced around it. These guidance pads 40 may be actuated to extend against the walls to thereby direct the penetrator and thereby the direction of the hole being formed. The length of extension of these pads 40 whereby the direction taken by the reactor is determined, may be controlled by a guidance system 42 which provides the required signals to pad drive apparatus 44, 46, there being a signal provided for each one of the guide pads 40, if required. The guidance system may be any of the well-known devices which may be either controlled from the surface by means such as wire, or radio waves, or which may have built-in direction sensing equipment and a memory whereby error signals may be generated to control the pad drive apparatus. An example of a suitable fully automatic guidance system may be found described in Exner et al., Patent No. 2,932,471. The control system described there may also be used to control the movement of the pads 40 to direct the motion of the penetrator. A simple manual control system can be one where each pad is driven to move in extension or retraction by a motor directly controlled by means of wires running to the surface, which wires are connected to a power source and a manually operated reversing switch.

When the reactor has drilled to a desired depth, it may be recovered through the same hole it has made, by pulling up on cables, not shown, or the pipe supplying the drilling mud. The drilling mud continuously provides the surface with samples of the rock through which the reactor is drilling and thus there is no necessity to wait for the return of the reactor, for examining rock strata specimens.

The thermal energy required for melting rock by the embodiment of this invention is comparable to thermal energy required by a heat engine powered mechanical drill. Furthermore, the drilling rate measured in linear depth of hole per second can be higher with this invention than with any other arrangement. The cost per linear foot of hole can also be lower using this embodiment of the invention than with other methods. Furthermore, a readily accessible hole is produced through which the embodiment of the invention may be recovered at any time and from which a continuous sampling of the material is traversed by the embodiment of the invention is provided. Finally, a continuous, strong impermeable compressively loaded hole casing is formed in-situ and simultaneously with the hole forming process.

In connection with the latter statement, the embodiment of the invention may be controlled so as to melt a larger diameter hole than is required. The additional melt-material lines the hole around the circumference of the reactor nozzles and this material is gradually cooled to achieve the proper crystalline structure. The upper side walls of the embodiment of the invention by reason of the wall smoothing action performed by pads and insulation 28, acts to provide a smooth but compressively loaded hole casing having sufficient impermeability to prevent contaminant infiltration into the hole.

Figure 3:
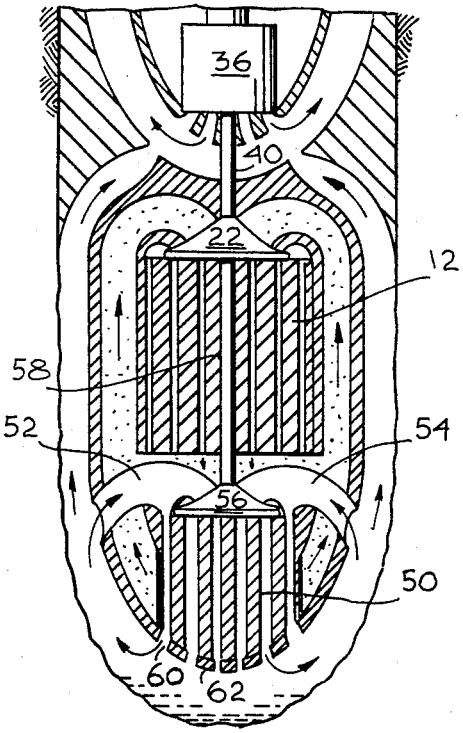
FIGURE 3 is a cross-sectional view showing another arrangement in accordance with this invention for the application of heat from a thermally powered penetrator to the rock to be melted.

FIGURE 3 is a cross-sectional view of a second embodiment of the invention and more particularly shows a different arrangement for melting the rock with the heat generated by the reactor. Apparatus in FIGURE 3 which performs the same function as similar apparatus in FIGURE 1 bears the same reference numerals. Thus, the thermal generator 12 has a pump 22 which pumps the coolant through the cores of the thermal generator and thereafter into tubes of a heat exchanger 50. Lava is formed by the front end of the heat exchanger coming in contact with the rock which is melted and then forced upward by the downward pressure of the reactor. The lava passes along the side of the thermal generator, but this time some of the lava is diverted through nozzles 52, 54 into the blades of an impeller 56. This impeller has a shaft 58 which is driven from the shaft 40 of the thermal generator coolant impeller 22. The impeller 56 drives the lava into over and around the tubes of the heat exchanger 50 where its temperature is raised. The lava flows through the openings 60 in the bottom of the face plate 62 where it then can melt the rock underneath the reactor. That portion of the lava which does not flow over the tubes 52, 54 continues up the side of the reactor into the lava nozzles 23, 23 whereby it is injected into the drilling mud, as before.

In the embodiment of the invention shown in FIGURE 3, the heated lava in the heat exchanger is injected at high velocity by the impeller 21 against the strata which is to be melted. The high velocity of the lava increases the heat transfer rate to the strata and increases the erosion rate of the strata. Both the higher heat transfer rate and the erosion markedly increase the drilling rate relative to the embodiment shown in FIGURE 1.

Figure 4:
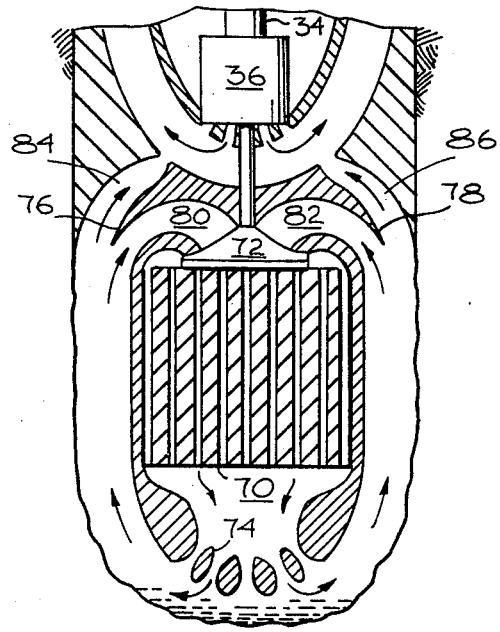
FIGURE 4 illustrates another arrangement in accordance with this invention for melting rock.

FIGURE 4 is a cross-section of another embodiment of the invention. Here again, only the thermal generator portion of the embodiment of the invention is shown since it is only here that there are changes. This modification of the invention eliminates the heat exchanger and a separate coolant. The thermal generator 70, if a nuclear reactor, must necessarily be a fast reactor to minimize the effect of high neutron cross-section material that may be encountered in the strata. The thermal generator heats the coolandt which this time is lava. The lava is ejected from the thermal generator at high velocity by reason of the operation of the impeller 72, which is driven from the turbine pump 36. The high temperature high velocity lava passes through the holes in the face plate 74 and impinges on the rock, which it readily melts. The molten lava then flows up the side walls until it meets a structure which may be called a diverter 76, 78 which effectively provides the junction of two tubes 80, 82 and 84, 86. The tubes 80, 82 pass some of the lava through the impeller 72 where it is circulated through the thermal generator to be reheated and used for melting further strata. The remaining portion of the lava passes through the nozzles 84, 86 which is injected into the drilling mud, as before.

Although the embodiment of the invention shown in FIGURE 4 seems the most direct, it requires the reactor material to be compatible with the corrosive lava and have desirable nuclear properties, such as a high radiation resistance, a low resonance integral, and have a high melting temperature. This can restrict the reactor material to a mixed boride (diboride composed of boron-11) or a carbide such as silicon carbide or zirconium carbide. It is necessary to initially prime this embodiment of the invention with lava or some other suitable liquid, such as are presently used in reactors, i.e. liquid sodium, after which it will continue to function.

Figure 5:
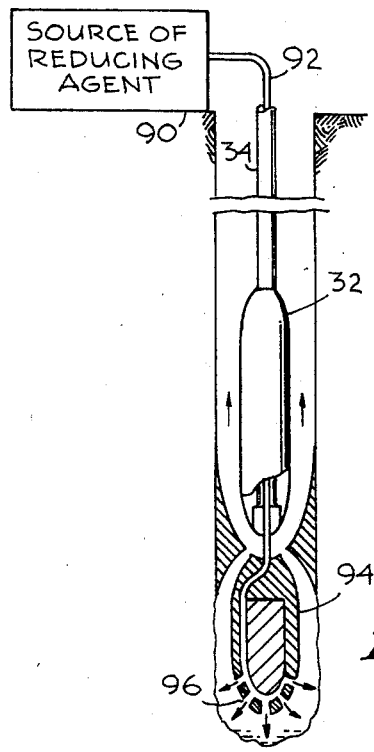
FIGURE 5 illustrates an arrangement for bringing a reducing agent to the digging end of a penetrator, in accordance with this invention.

FIGURE 5 shows an arrangement for supplying a reducing agent from the surface to prevent corrosion and/or oxidation which can occur when the hot lava comes in contact with the surfaces of the apparatus. The reducing agent may be a gas such as hydrogen, which is supplied from a source 90. A pipe 92 extends from the source 90 either down the mud supply pipe 34, as shown, or outside of it to the casing 94 of the thermal generator. There the pipe passes through an internal passageway to openings 96, 96, in the front or working end of the casing from which the reducing gas is ejected to be mixed with the molten rock and thus prevent it from causing oxidation.

Figure 6:
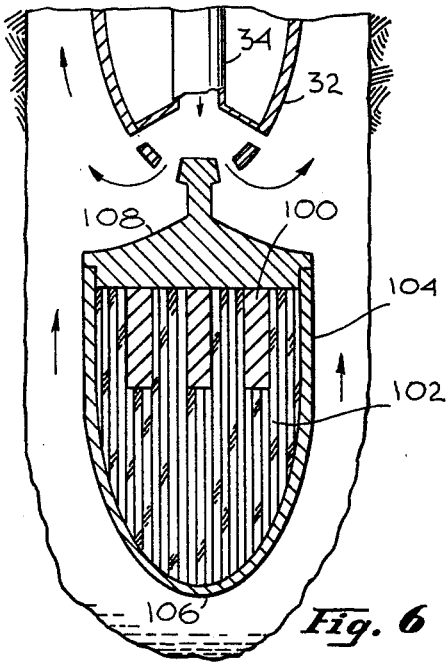
FIGURE 6 illustrates another arrangement for applying thermal energy to melt rock, from a thermal energy generator.

FIGURE 6 illustrates another arrangement, in accordance with this invention, for applying heat from the thermal generator to the earth or rock to melt them. The rods 100, as before, may generate heat either by having electrical energy applied thereto or by reason of the reaction of the nuclear material of which they are composed. These rods are in contact with "A-axis" pyrolytic graphite 102 which extends to the casing 104 and more particularly to the face plate 106. "A-axis" graphite has the property that it readily conducts heat with little loss along its "A-axis" or laminar axis and essentially does not conduct heat in other directions. Accordingly heat from the thermal generator is conducted to the face plate from the thermal generator rods 100 by the A-axis pyrolytic graphite which is oriented in the proper direction to do so. The back side 108 of the casing 104 is made of insulating material.

The remaining structure of the penetrator, which is not shown in FIGURE 6, is the same as is shown in FIGURE 1, except that a turbine motor 36 is obviously not required with the arrangement shown.

There has accordingly been described and shown herein a novel, useful and unique arrangement for employing a thermal generator such as a nuclear reactor for drilling holes through the earth's crust.

What is claimed is:
1. Apparatus for tunneling through material comprising, heat generating means for generating temperatures higher than the melting temperature of the material through which it is desired to tunnel, means for applying heat from said heat generating means to said material to cause it to become molten, means for removing said molten material to leave a hole, means for in situ forming compressively loaded hole casing from molten material, and means for guiding said heat generating means to determine the direction of said hole.

2. Apparatus for tunneling as recited in claim 1 wherein said means for applying heat from said heat generating means to said material includes a coolant, and means for pumping said coolant through said means for generating temperatures to elevate said coolant temperature and then to a location where said coolant can heat said material to be melted.

3. Apparatus for tunneling as recited in claim 2 wherein said coolant is some of the same molten material as the material which is being removed in said tunneling operation.

4. Apparatus for tunneling as recited in claim 1 wherein said means for applying heat from said heat generating means to said material includes A-axis pyrolytic graphite which extends between said means for generating and said material to be melted and has its A-axis oriented in a direction for conducting heat therebetween.

5. Apparatus as recited in claim 1 wherein said means for generating temperatures comprises a nuclear reactor.

6. Apparatus as recited in claim 1 wherein said means for generating temperatures comprises refractory material, and electrical means for heating said refractory material.

7. Apparatus for tunneling by melting earth and rock comprising heat generating means operable for generating temperatures higher than the melting temperature of rock formations in the region of the earth to be penetrated, a coolant for said heat generating means, means for circulating said coolant through said heat generating means for bringing the temperature of said coolant above that required to melt rock, means for applying heat from said coolant to said rock formation to be melted including means for pumping said coolant between said heat generating means and a region at which heat from said coolant is applied to said rock formation, and means for removing rock which is melted including a source of drilling mud, means for pumping said drilling mud to the location of said heat generating means and back, and means for mixing said melted rock with said returning drilling mud at the location of said heat generating means.

8. Apparatus for tunneling as recited in claim 7 wherein said heat generating means comprises a nuclear reactor.

9. Apparatus for tunneling as recited in claim 7 wherein said heat generating means comprises refractory material, and means for electrically heating said refractory material.

10. Apparatus as recited in claim 7 wherein said means for applying said coolant to said strata to melt said strata comprises a coolant fluid circulating chamber enclosing said heat generating means and including a face plate at one end thereof which is urged against rock to be melted, and means for directing said coolant in the process of circulation against said face plate to cause said face plate to assume the temperature of said coolant.

11. Apparatus as recited in claim 7 wherein said means for applying said coolant to said rock for melting said rock includes a heat exchanger, means coupling said heat exchanger to said means for pumping said coolant to circulate said coolant through said heat exchanger, said heat exchanger having an input end and an output end, means for pumping melted rock into the input end of said heat exchanger for raising its temperature to that of said coolant and out of the output end of said heat exchanger, means positioning said output end of said heat exchanger for application to rock to be melted, and nozzle means diverting rock which is melted into said means for pumping melted rock.

12. Apparatus as recited in claim 7 wherein said coolant is melted strata and said heat generating means includes a face plate having apertures therethrough for directing said coolant toward strata to be melted, and nozzle means for directing starta which is melted into said means for pumping coolant.

13. Apparatus as recited in claim 7 wherein there is included a source of a reducing agent and means for applying said reducing agent to said melted rock.

14. Apparatus for penetrating subsurface strata comprising reactor means for generating temperatures higher than required for melting said strata, means for applying the heat generated by said reactor for melting said strata including a coolant and means for pumping said coolant through said reactor means to cause said coolant to approach the temperature of said reactor means and then to a location for transferring the heat of said coolant to rock to be melted, means for driving the pump means, a source of drilling mud, means for pumping said source of drilling mud through the hole formed by the melting of rock by said reactor means coolant and back, and means for removing melted strata from said reactor means including nozzle means for injecting said melted strata into said drilling mud for being carried back to said drilling mud pumping means, means attached to said reactor means for forming and smoothing the walls of the hole left by the removal of said melted strata, and means for determining the path taken by said apparatus through said melted strata.

15. Apparatus as recited in claim 14 wherein said means for determining the path taken by said apparatus through said melted strata includes support means attached to said reactor means and extending rearwardly therefrom away from the region of melting strata, a plurality of guide pads extending from said support means outward to the walls of the hole formed by the removal of said melted strata, a plurality of fixed pads extending from said support means outward to the walls of said hole formed by the removal of said melted strata, said fixed guide pads being located spaced from said movable guide pads and closed to said reactor means, and means for adjusting the lengths of extension of said movable guide pads to thereby direct the path being taken by said reactor means at a predetermined angle.

16. Apparatus as recited in claim 14 wherein there is included a source of reducing agent, and means for applying said reducing agent to said melted strata.

17. Apparatus for tunneling through subsurface strata comprising reactor means for generating temperatures higher than required for melting said strata, means for applying the heat generated by said reactor means to said strata for melting said strata comprising A-axis pyrolytic graphite extending from said reactor means to said strata with its A-axis oriented to guide heat from said reactor means to said strata, a source of drilling mud, means for pumping said drilling mud from said source to the vicinity of said melted strata and back to said source, means for mixing said melted strata with said drilling mud to carry said melted strata away, and means for controlling the direction taken by said apparatus for tunneling.

References Cited

UNITED STATES PATENTS

| | | | |
|---|---|---|---|
| 1,518,370 | 12/1924 | Thomas | 175—325 |
| 1,666,488 | 4/1928 | Crawshaw | 299—3 X |
| 1,898,926 | 2/1933 | Aarts et al. | 175—16 |
| 2,738,162 | 3/1956 | Aitchison | 175—15 X |
| 2,996,444 | 8/1961 | Simnad | 176—39 X |
| 3,115,194 | 12/1963 | Adams | 175—11 |
| 3,127,319 | 3/1964 | Natland | 166—57 |
| 3,141,512 | 7/1964 | Gaskell et al. | 175—73 X |
| 3,179,187 | 4/1965 | Sarapuu | 175—16 |
| 1,993,642, | 3/1935 | Aarts et al. | 175—16 |

FOREIGN PATENTS 217,265    9/1958    Australia.

CHARLES E. O'CONNELL, *Primary Examiner.*

I. A. CALVERT, *Assistant Examiner.*